United States Patent
Riat

(10) Patent No.: US 6,925,859 B2
(45) Date of Patent: Aug. 9, 2005

(54) DEVICE FOR DETECTING A RUNNING SURFACE AND VEHICLE USING SAME

(75) Inventor: Jean-Christophe Riat, Bezons (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 14 days.

(21) Appl. No.: 10/311,359

(22) PCT Filed: Mar. 7, 2002

(86) PCT No.: PCT/FR02/00828

§ 371 (c)(1),
(2), (4) Date: Jan. 9, 2003

(87) PCT Pub. No.: WO02/071363

PCT Pub. Date: Sep. 12, 2002

(65) Prior Publication Data

US 2004/0011120 A1 Jan. 22, 2004

(30) Foreign Application Priority Data

Mar. 8, 2001 (FR) .............................. 01 03162

(51) Int. Cl.⁷ .............................................. G01B 21/16
(52) U.S. Cl. ......................... 73/104; 340/904; 340/905; 340/933; 340/937; 340/942; 340/943; 340/425.5; 340/435; 702/150; 701/116
(58) Field of Search ........................... 73/104; 340/901, 340/904, 905, 933, 937, 942, 943, 435, 425.5; 702/150, 159; 701/116

(56) References Cited

U.S. PATENT DOCUMENTS

| | | | | |
|---|---|---|---|---|
| 3,708,668 A | * | 1/1973 | Tilley | 250/202 |
| 4,348,652 A | * | 9/1982 | Barnes et al. | 340/904 |
| 4,401,181 A | * | 8/1983 | Schwarz | 180/168 |
| 5,225,827 A | | 7/1993 | Persson | 340/904 |
| 5,568,137 A | * | 10/1996 | Liu | 340/905 |
| 5,982,278 A | | 11/1999 | Cuvelier | 340/436 |
| 6,038,496 A | * | 3/2000 | Dobler et al. | 701/3 |
| 6,157,320 A | * | 12/2000 | Yujiri et al. | 340/901 |
| 6,498,570 B2 | * | 12/2002 | Ross | 340/901 |
| 2002/0105438 A1 | * | 8/2002 | Forbes et al. | 340/901 |

FOREIGN PATENT DOCUMENTS

| | | | |
|---|---|---|---|
| EP | 0 049 722 A1 | 4/1982 | |
| EP | 0 451 117 A2 | 10/1991 | |
| EP | 0 960 775 A1 | 12/1999 | |
| FR | 2 759 647 | 8/1998 | |
| GB | 2317009 | * 11/1998 | 340/942 |
| JP | 9-39601 | * 2/1997 | 340/901 |

* cited by examiner

Primary Examiner—Daniel S. Larkin
(74) Attorney, Agent, or Firm—Westerman, Hattori, Daniels & Adrian, LLP

(57) ABSTRACT

A device for detecting a running surface for a vehicle, comprising a plurality of sensors (c1 to c8) designed to be oriented towards the running surface to detect modifications thereof, data processing means for processing data derived from the sensors, wherein the sensors are relatively arranged so as to associate at least part of the points of aim on the ground (v1 to v8) in pairs (p1 to p4), the two points of aim on ground the ground being spaced apart by a first specific distance, and the transverse distances separating two adjacent pairs (p1 to p4) of points of aim on the ground increase towards a longitudinal axis along a direction substantially perpendicular to said axis.

24 Claims, 2 Drawing Sheets

DEVICE FOR DETECTING A RUNNING SURFACE AND VEHICLE USING SAME

Figure 1:
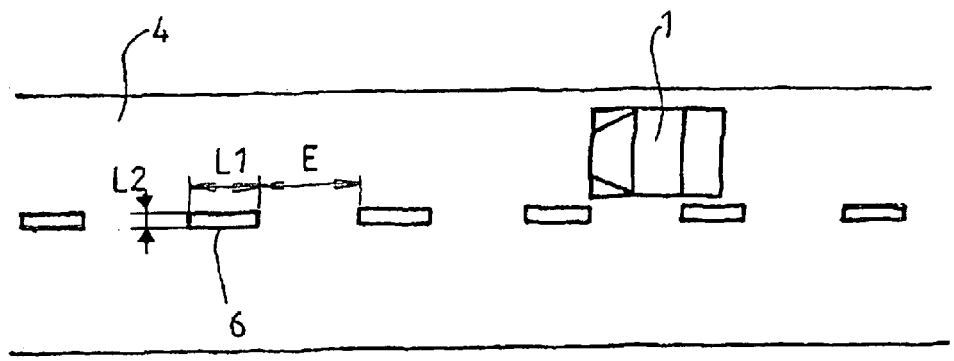

The invention relates to a device for detecting a running surface for a vehicle and to a vehicle using such a detection device.

The invention concerns more particularly a detection device comprising a plurality of sensors designed to be oriented toward a running surface to detect modifications thereof, as well as to means for processing data obtained by the sensors.

Document EP860001 describes such a detection device applied to a vehicle and using infrared sensors in order to signal to a vehicle user a possible modification of the running surface or the crossing of a marking line on the ground.

This type of device generally functions satisfactorily, but in some cases, it does not allow one to detect with sufficient quality all modifications of the running surface.

An objective of the present invention is to propose a device for detecting a running surface having a detection quality improved as compared to the prior art, while being of a simple and cost-effective construction.

To this effect, the device according to the invention, which otherwise conforms to the generic definition given in the preamble above, is essentially characterized in that the sensors are disposed relative to each other so as to associate at least a part of their points of aim on the ground by pairs, the two points of aim of a pair being spaced apart by a first specified distance, and in that the transverse distances separating two adjacent pairs of points of aim on the ground increase towards a longitudinal axis along a direction substantially perpendicular to that axis.

Further, the invention may comprise one or several of the following characteristics:
  the device comprises at least two pairs of sensors,
  the sensors are disposed on both sides of a median longitudinal axis, and the transverse distances separating the pairs of points of aim on the ground of sensors are substantially symmetrical with respect to the median longitudinal axis,
  the transverse distance dn in cm separating two adjacent pairs of points of aim on the ground is given by the formula dn=K.R$^n$, where n is the serial number of the pair pn of points of aim on the ground towards the longitudinal axis, R is a first constant multiplicative coefficient comprised approximately between 1 and 2, and K is a second constant coefficient comprised approximately between 10 and 80,
  the transverse distance dn in cm separating two adjacent pairs of points of aim on the ground of sensors is given by the formula $$dn = (L2+e) \cdot \left(\frac{E+L1}{E+2c}\right)^n,$$

so as to detect in particular an interrupted marking line on the ground, and where n is the serial number of the pair of points of aim on the ground towards the axis, L1 the length in cm of a segment of the interrupted line, L2 the width in cm of a segment of the interrupted line, E the distance in cm separating two successive segments, e the distance in cm separating two points of aim on the ground of a same pair, and c a specified constant in cm defining a detection security margin.

Another objective of the invention is to propose a vehicle using such a device, remedying all or part of the drawbacks of the prior art.

To this effect, the vehicle according to the invention comprising a plurality of sensors oriented towards the running surface to detect modifications thereof, and means for processing data obtained by the sensors, is characterized in that the sensors are disposed relative to each other so as to associate at least a part of their points of aim on the ground by pairs, the two points of aim on the ground of a pair being spaced apart by a first specified distance, and in that the transverse distances separating two adjacent pairs of points of aim on the ground increase from the outside towards the inside of the vehicle along a direction substantially perpendicular to the longitudinal axis of the vehicle.

Further, the invention may comprise one or more of the following characteristics:
  the sensors are disposed on both sides of the median longitudinal axis of the vehicle, and the transverse distances separating the pairs of points of aim on the ground of sensors are substantially symmetrical with respect to the median longitudinal axis,
  the transverse distance dn in cm separating two adjacent pairs of points of aim on the ground is given by the formula dn=K.R$^n$, where n is the serial number of the pair pn of points of aim on the ground towards the longitudinal axis, R is a first constant multiplicative coefficient comprised approximately between 1 and 2, and K is a second constant coefficient comprised approximately between 10 and 80,
  the transverse distances dn in cm separating two adjacent pairs of points of aim on the ground of sensors are given by the formula $$dn = (L2+e) \cdot \left(\frac{E+L1}{E+2c}\right)^n,$$

so as to detect in particular an interrupted marking line on the ground, and where n is the serial number of the pair of points of aim on the ground towards the longitudinal axis, L1 the length in cm of a segment of the interrupted line, L2 the width in cm of a segment of the interrupted line, E the distance in cm separating two successive segments, e the distance in cm separating two sensors of a same pair of points of aim on the ground, and c a specified constant in cm defining a detection security margin,
  at least a part of the sensors are slanted with respect to a vertical axis at an angle substantially equal or above the half-angle of their vision cone,
  at least a part of the sensors are slanted with respect to the vertical at an angle comprised approximately between 5 and 45 degrees,
  at least a part of the sensors are disposed in the front bumper of the vehicle,
  the vehicle comprises seven pairs of sensors,
  the distance separating the two points of aim on the ground of a same pair is comprised approximately between 5 and 25 cm.

Figure 2:
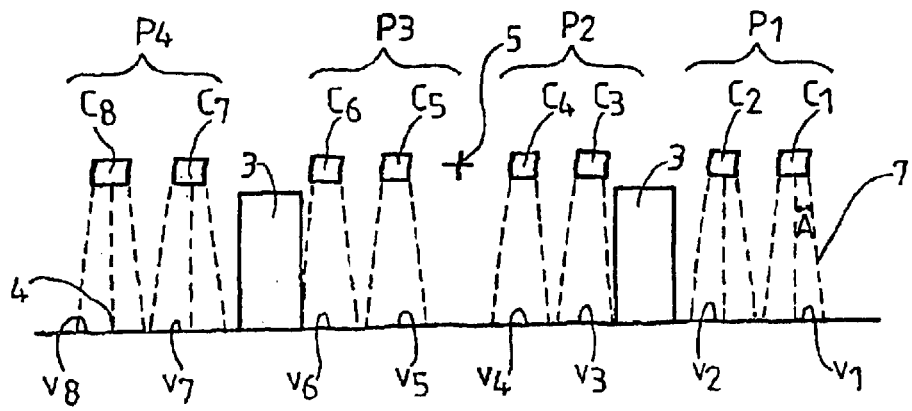
Figure 3:
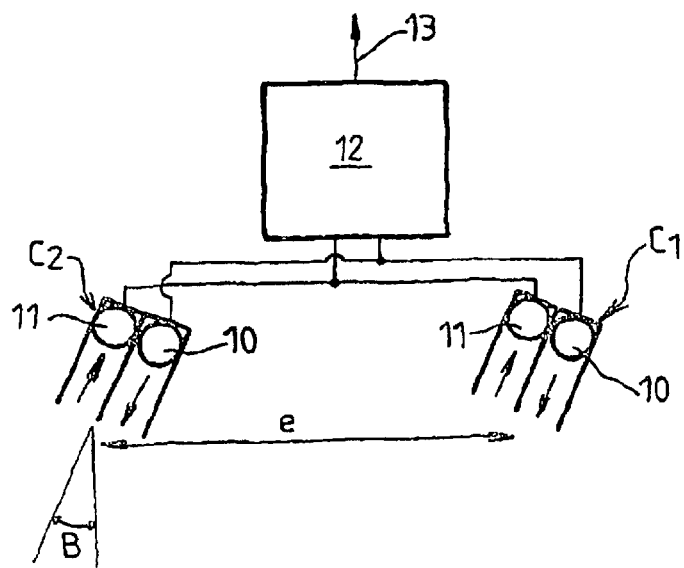
Figure 4:
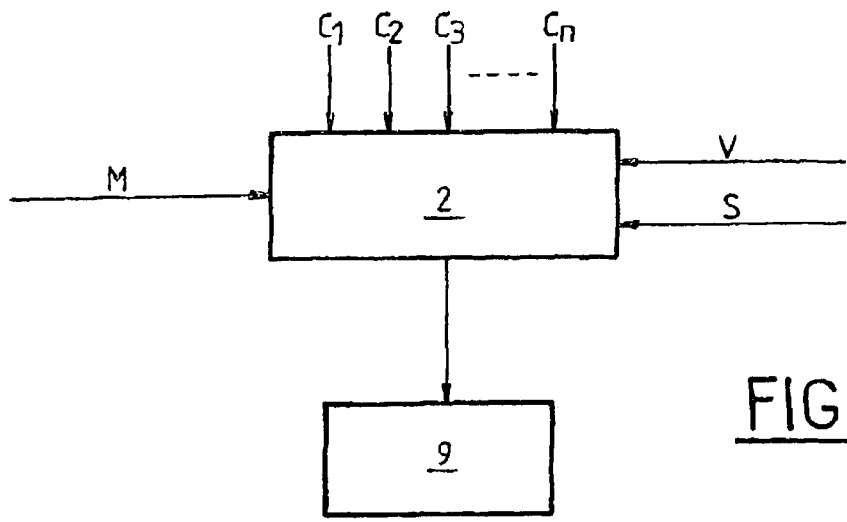
Figure 5:
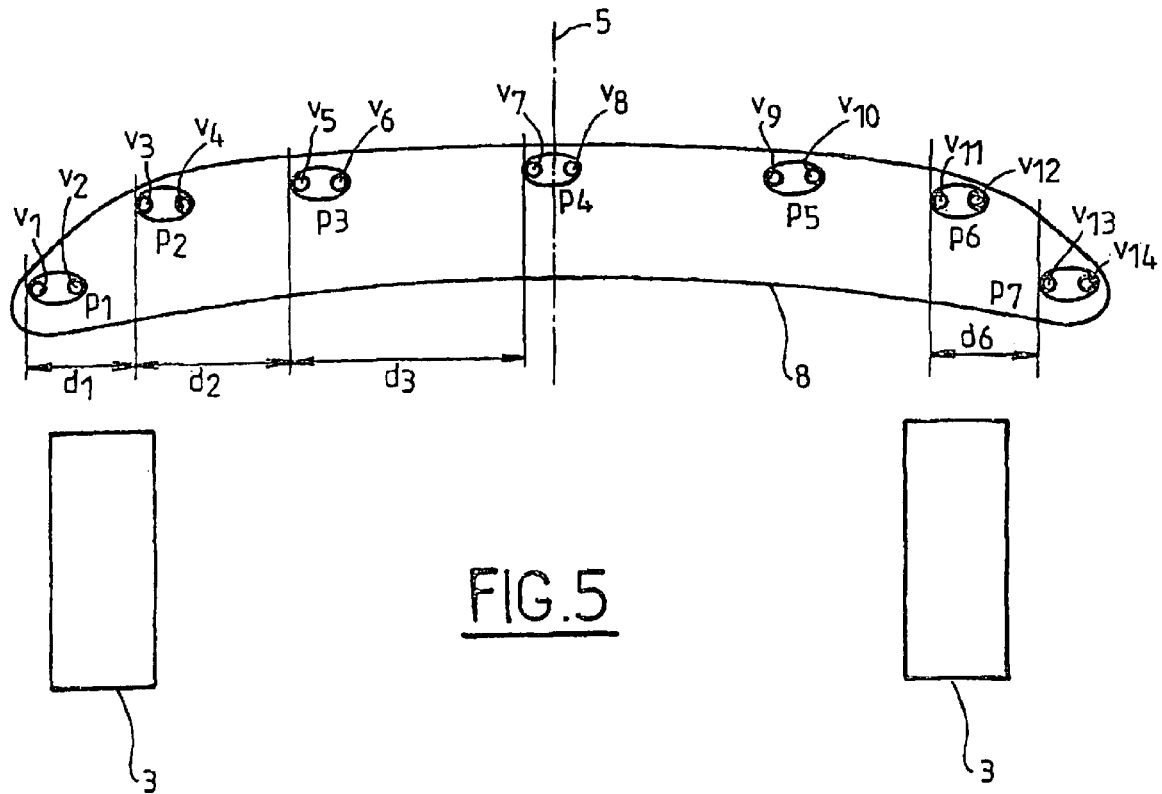

Other particularities and advantages will appear in reading the following description in reference to the figures in which:

FIG. 1 is a schematic top view of a vehicle on a road,

FIG. 2 is a schematic and partial view of a vehicle front part, illustrating a first arrangement of detection sensors according to the invention, FIG. 3 is a schematic view of the structure of a pair of sensors according to the invention, FIG. 4 is a synoptic view of the structure and operation of the detection device according to a preferred embodiment of the invention, and FIG. 5 is a schematic and partial view of a vehicle front part, illustrating the distribution of the points of aim on the ground of a second arrangement of sensors according to the invention.

The device for detecting a running surface according to the invention illustrated in particular in FIGS. 2 and 4 comprises a plurality of sensors c1 to cn connected to data processing means 2 such as a computer.

In the embodiment described above, the sensors are mounted on a vehicle 1 and oriented towards the running surface 4 to detect modifications thereof, and in particular marking lines on the ground. Each sensor C1 to C8 has a surface or point of aim on the ground respectively v1 to v8. The data processing means 2 are constituted, for example, by a computer of a multiplexed network of the vehicle 1.

According to the invention, the vehicle 1 comprises a plurality of sensors disposed relative to each other so that at least a part of the points of aim on the ground of the sensors are associated in pairs, the two points of aim on the ground of each pair being spaced apart by a first specified distance e as shown in FIG. 3. Further, the sensors are disposed relative to each other so that the transverse distances separating two adjacent pairs of points of aim on the ground increase from the outside towards the inside of the vehicle 1 along a direction substantially perpendicular to the longitudinal axis 5 of the vehicle.

Indeed, surprisingly, such an arrangement of the sensors provides an improved quality of detection compared to prior art systems. In particular, it is observed that the invention allows a more secure and more complete detection of a discontinuity in the running surface, and in particular of a marking line on the ground.

FIG. 3 illustrates an embodiment of a pair of sensors C1, C2 spaced apart by a distance e and having substantially parallel detection axes. Each sensor C1, C2 comprises means 10 for emitting waves in a range of light that is little disturbed and means 11 for receiving these reflected waves. For example, the sensors C1, C2 operate in the infrared range. The wave emission means 10 and wave reception means 11 are, for example, connected to amplification means 12 providing, at their output 13, data for the computer 2 (FIG. 4).

In the embodiment described in FIG. 2, the vehicle comprises four pairs P1 to P4 of sensors C1 to C8. Preferably, the four pairs P1 to P4 of sensors C1 to C8 are disposed so that their points of aim on the ground v1 to v8 are associated in pairs P1 to P4, the pairs of points of aim on the ground being disposed in a substantially symmetrical manner with respect to the median longitudinal axis of the vehicle. The two points of aim on the ground of a same pair are spaced apart, for example, by approximately 5 to 20 cm, and preferably approximately 10 cm.

Further, the two adjacent pairs of sensors P1, P2 or P4, P3 located on a same side of the vehicle form pairs of points of aim on the ground spaced apart by approximately 15 to 50 cm, and preferably approximately 24 cm.

In an advantageous variant, the transverse distance dn in cm separating two adjacent pairs Pn, Pn+1 of points of aim on the ground of sensors is given by the formula $dn = K.R^n$, where n is the serial number of the pair Pn of points of aim on the ground towards the longitudinal axis 5, R is a first constant multiplicative coefficient comprised approximately between 1 and 2, and K is a second constant coefficient comprised approximately between 10 and 80.

As before, this conformation provides an improved detection compared to prior art systems, while accommodating a simple construction and a low cost.

In another advantageous variant, the position of the sensors Cn can be adapted in particular to the detection of interrupted marking lines on the ground (FIG. 1). Thus, the transverse distance dn in cm separating two adjacent pairs Pn, Pn+1 of points of aim on the ground vn can be given by the formula $$dn = (L2 + e) \cdot \left(\frac{E + L1}{E + 2c}\right)^n,$$

so as to detect in particular an interrupted marking line on the ground, and where n is the serial number of the pair Pn of points of aim on the ground towards the axis, L1 the length in cm of a segment of the interrupted line, L2 the width in cm of a segment of the interrupted line, E the distance in cm separating two successive segments, e the distance in cm separating two points of aim on the ground of a same pair, and c a specified constant in cm defining a detection security margin.

The detection security margin c is selected arbitrarily as a function of the applications envisioned and of the detection precision desired. The security margin c constitutes the minimal monitoring distance on the ground by a sensor from which a modification can be considered as a potential marking. This is to say that the security margin c acts as a filter-forming distance, so as not to take into account small objects present on the running surface 4, such as papers. The security margin c can be fixed at a value comprised, for example, between 0 and 50 cm, and preferably approximately 20 cm.

This arrangement of sensors according to the invention allows a secure detection of modifications of the running surface 4 of the vehicle 1 and is particularly well adapted to the detection of an interrupted marking 4 on the ground.

In particular, it has been observed that such an arrangement allows a secure and early detection of a drift of a vehicle from its trajectory, notably with respect to an interrupted marking line on the ground. Thus, when the vehicle drifts from its trajectory with a small incident angle and the running surface changes (for example by passing across an interrupted marking line), the pairs P1, Pn of points of aim on the ground vn situated the most towards the outside of the vehicle 1 detect this situation. A drift with a slightly higher incident angle is detected by the following pairs P2, Pn−1 of points of aim on the ground vn, and so on.

This is to say that it has been observed that the smaller the incident angle of the vehicle with respect to a border (interrupted marking or other surface change), the more the detection is performed by the sensors oriented towards the outside of the vehicle. This detection by the so-called "outside sensors" allows an early detection of a possible drift of the vehicle 1 from its trajectory.

In order to size the device according to the invention so that it detects any interrupted marking line on the ground, that is, in order to allow it to adapt to different markings in different countries, one can use the formula $$dn = (L2 + e) \cdot \left(\frac{E + L1}{E + 2c}\right)^n,$$

while fixing the segment width value L2 to its lower possible value.

Similarly, the factor $$\frac{E+L1}{E+2c}$$

is fixed at its lower possible value encountered as a function of the characteristics of the known markings on the ground.

In the case of most European countries, the minimal segment width is on the order of 10 cm while the factor $$\frac{E+L1}{E+2c}$$

is substantially equal to 1.2 (security margin fixed at 20 cm).

Thus, by separating the two points of aim on the ground of each pair Pn by a distance of approximately 10 cm, the transverse distance dn in cm separating two adjacent pairs Pn, Pn+1 of points of aim on the ground can be given by the formula: $dn=10\times 1.2^n$.

The vehicle illustrated on FIG. 5 comprises seven pairs P1 to P7 of sensors disposed in the front bumper 8 of the vehicle, in front of the front wheels 3 of the vehicle, and in conformity with the above formula. The fourteen sensors are represented symbolically only by their points of aim on the ground v1 to v14.

Thus, the distance d1 between the first P1 and the second P2 pairs of points of aim on the ground is substantially equal to 24 cm; the distance d2 between the second P2 and the third P3 pairs of points of aim on the ground is substantially equal to 29 cm; and the distance d3 between the third P3 and the fourth P4 pairs of points of aim on the ground is substantially equal to 24.7 cm.

The fourth pair P4 of points of aim on the ground v7, v8 is disposed at the level of the median longitudinal axis 5 of the vehicle. The fifth P5, sixth P6, and seventh P7 pairs of points of aim on the ground v9 to v14 are situated symmetrically on the other side of the median longitudinal axis 5 of the vehicle (d6=d1).

According to the invention, the sensors can be disposed in any manner according to directions parallel to the longitudinal axis 5 of the vehicle. However, preferably, the sensors C1 to Cn are disposed in the front part of the vehicle, so as to detect as early as possible a variation in the running surface 4. Similarly, the sensors can be disposed in any other part of the vehicle, for example, in the rear view mirrors.

Further, it is also possible to envision an arrangement of sensors comprising "simple" points of aim on the ground as well as pairs.

In addition, the infrared sensors can be replaced by or juxtaposed with ultrasonic sensors and/or video sensors or any equivalent element.

Of course, the invention is not limited to the embodiments described above. Thus, a device can be envisioned in which the pairs of points of aim on the ground are disposed on only one side of the vehicle, to monitor a surface change only on the side concerned. Similarly, the invention can comprise more than seven pairs of points of aim on the ground.

Further, all or a part of the sensors can be oriented laterally towards the outside of the vehicle.

In particular, the sensors can be slanted towards the front or towards the rear and/or towards a side of the vehicle with respect to a vertical axis.

Preferably, the slanting angle of the sensors with respect to the vertical is substantially equal to or higher than the half angle A of their vision cone 7. The vision cone 7 of a sensor C1 is defined by the angular window of the sensor vision (FIG. 2).

Preferably, the sensors are slanted with respect to the vertical by an angle B comprised approximately between five and forty-five degrees, and preferably fifteen degrees (FIG. 3).

The orientation of the sensors defined above associates a good ground detection quality with an early detection. Thus, it is observed that the obtained size, shape and position of the areas or points of aim on the ground emitted by the sensors improve the detection quality of the system with respect to the prior art.

Preferably, the surface on the ground aimed at by a sensor describes a substantially elliptical or circular area having a diameter on the order of approximately 5 to 10 cm. Further, the sensors are preferably situated at a height from the ground comprised approximately between 15 cm and 1 m.

Referring to FIG. 4, the detection device can be used to alert the driver of a possible drift of the vehicle from its trajectory. As a function of information obtained by the sensors C1, Cn, the data processing means 2 can activate security means 9, such as signaling means to the outside (blinkers, for example) or means for alerting the user of the vehicle (light, and/or sound, and/or tactile signal).

Advantageously, the activation or not of the security means 9 can also be made conditional to an information M representative of the operation or not of the detection system (switch, for example), and/or as a function of the speed V of the vehicle, and/or as a function of an activated or non-activated state S of the blinkers of the vehicle.

This is to say that the monitoring and security system can comprise a switch for controlling its turning on and off, which can be actuated by the vehicle user.

Activation of the monitoring and alert device when the speed V of the vehicle is higher than a threshold on the order of, for example, 80 km/h, can also be envisioned.

Preferably, also, the data processing means do not activate the security means 9 when a crossing link is detected quasi-simultaneously on both sides of the vehicle. In this manner, the normal crossing of a transverse line is not signaled to the vehicle user.

Similarly, the alert and security means can be activated only when the detection of an abnormal discontinuity by a first sensor is confirmed by at least a second measurement made by an adjacent sensor.

Finally, although the invention has been described in connection with particular embodiments, it comprises all technical equivalents to the described means.

What is claimed is:

1. Device for detecting a running surface for a vehicle, comprising a plurality of sensors designed to be oriented towards the running surface to detect modifications thereof, means for processing data obtained by the sensors, wherein the sensors are disposed relative to each other so as to associate at least a part of their points of aim on the ground by pairs, the two points of aim of a pair being spaced apart by a first specified distance (e), and in that transverse distances separating two adjacent pairs of points of aim on the ground increase towards a longitudinal axis along a direction substantially perpendicular to that axis.

2. Detection device according to claim 1, comprising at least two pairs of sensors.

3. Detection device according to claim 2, wherein the sensors are disposed on both sides of a median longitudinal axis, and in that the transverse distances separating the adjacent pairs of points of aim on the ground of sensors are substantially symmetrical with respect to a median longitudinal axis.

4. Detection device according to claim 2, wherein the transverse distance (dn) in cm separating two adjacent pairs (Pn, Pn+1) of points of aim on the ground is given by the formula dn=K.R$^n$, where n is the serial number of the pair (Pn) of points of aim on the ground (vn) towards the longitudinal axis, R is a first constant multiplicative coefficient comprised approximately between 1 and 2, and K is a second constant coefficient comprised approximately between 10 and 80.

5. Detection device according to claim 4, wherein R is comprised approximately between 1 and 1.2.

6. Detection device according to claim 2, wherein the transverse distance (dn) in cm separating two adjacent pairs (Pn, Pn+1) of points of aim on the ground of sensors is given by the formula $$dn = (L2 + e) \cdot \left(\frac{E + L1}{E + 2c}\right)^n,$$

so as to detect in particular an interrupted marking line on the ground, and where n is the serial number of the pair (Pn) of points of aim on the ground (vn) towards the axis, L1 the length in cm of a segment of the interrupted line, L2 the width in cm of a segment of the interrupted line, E the distance of cm separating two successive segments, e the distance in cm separating two points of aim on the ground of a same pair (Pn), and c a specified constant in cm defining a detection security margin.

7. Detection device according to claim 1, wherein the sensors are disposed on both sides of a median longitudinal axis, and in that the transverse distances separating the adjacent pairs of points of aim on the ground of sensors are substantially symmetrical with respect to the median longitudinal axis.

8. Detection device according to claim 1, wherein the transverse distance (dn) in cm separating two adjacent pairs (Pn, Pn+1) of points of aim on the ground is given by the formula dn=K.R$^n$, where n is the serial number of the pair (Pn) of points of aim on the ground (vn) towards the longitudinal axis, R is a first constant multiplicative coefficient comprised approximately between 1 and 2, and K is a second constant coefficient comprised approximately between 10 and 80.

9. Detection device according to claim 8, wherein R is comprised approximately between 1 and 1.2.

10. Detection device according to claim 1, wherein the transverse distance (dn) in cm separating two adjacent pairs (Pn, Pn+1) of points of aim on the ground of sensors is given by the formula $$dn = (L2 + e) \cdot \left(\frac{E + L1}{E + 2c}\right)^n,$$

so as to detect in particular an interrupted marking line on the ground, and where n is the serial number of the pair (Pn) of points of aim on the ground (vn) towards the axis, L1 the length in cm of a segment of the interrupted line, L2 the width in cm of a segment of the interrupted line, E the distance in cm separating two successive segments, e the distance in cm separating two points of aim on the ground of a same pair (Pn), and c a specified constant in cm defining a detection security margin.

11. Vehicle using a detection device according to claim 1, comprising a plurality of sensors oriented towards the running surface to detect modifications thereof, and means for processing data obtained by the sensors, wherein the sensors are disposed relative to each other so as to associate at least a part of their points of aim on the ground (vn) by pairs (Pn), the two points of aim on the ground of a pair being spaced apart by a first specified distance (e), and in that the transverse distances separating two adjacent pairs of points of aim on the ground increase from the outside towards the inside of the vehicle along a direction substantially perpendicular to the longitudinal axis of the vehicle.

12. Vehicle according to claim 11, wherein the sensors are disposed on both sides of the median longitudinal axis of the vehicle, and in that the transverse distances separating the pairs of points of aim on the ground of sensors are substantially symmetrical with respect to the median longitudinal axis.

13. Vehicle according to claim 12, wherein the transverse distances (dn) in cm separating two adjacent pairs (Pn, Pn+1) of points of aim on the ground are given by the formula dn=K.R$^n$, where n is the serial number of the pair (Pn) of points of aim on the ground towards the longitudinal axis, R is a first constant multiplicative coefficient comprised approximately between 1 and 2, and K is a second constant coefficient comprised approximately between 10 and 80.

14. Vehicle according to claim 13, wherein R is comprised approximately between 1 and 1.2.

15. Vehicle according to claim 12, wherein the transverse distances (dn) in cm separating two adjacent pairs (Pn, Pn+1) of points of aim on the ground of sensors are given by the formula $$dn = (L2 + e) \cdot \left(\frac{E + L1}{E + 2c}\right)^n,$$

so as to detect in particular an interrupted marking line on the ground, and where n is the serial number of the pair (Pn) of points of aim on the ground (vn) towards the longitudinal axis, L1 the length in cm of the segment of the interrupted line, L2 the width in cm of a segment of the interrupted line, E the distance in cm separating two successive segments, e the distance in cm separating two sensors of a same pair (Pn) of points of aim on the ground, and c a specified constant in cm defining a detection security margin.

16. Vehicle according to claim 12, wherein at least a part of the sensors are slanted with respect to the vertical, at an angle substantially equal to or higher than the half angle (A) their vision cone.

17. Vehicle according to claim 11, wherein the transverse distances (dn) in cm separating two adjacent pairs (Pn, +1) of points of aim on the ground are given by the formula dn=K.R$^n$, where n is the serial number of the pair (Pn) of points of aim on the ground towards the longitudinal axis, R is a first constant multiplicative coefficient comprised approximately between 1 and 2, and K is a second constant coefficient comprised approximately between 10 and 80.

18. Vehicle according to claim 17, wherein R is comprised approximately between 1 and 1.2.

19. Vehicle according to claim 11, wherein the transverse distances (dn) in cm separating two adjacent pairs (Pn, Pn+1) of points of aim on the ground of sensors are given by the formula $$dn = (L2 + e) \cdot \left(\frac{E + L1}{E + 2c}\right)^n,$$

so as to detect in particular an interrupted marking line on the ground, and where n is the serial number of the pair (Pn) of points of aim on the ground (vn) towards the longitudinal axis, L1 the length in cm of a segment of the interrupted line, L2 the width in cm of a segment of the interrupted line, E the distance in cm separating two successive segments, e the distance in cm separating two sensors of a same pair (Pn) of points of aim on the ground, and c a specified constant in cm defining a detection security margin.

20. Vehicle according to claim 11, wherein at least a part of the sensors are slanted with respect to a vertical axis, at an angle substantially equal to or higher than the half angle (A) of their vision cone.

21. Vehicle according to claim 11, wherein at least a part of the sensors are slanted with respect to the vertical at an angle (B) comprised approximately between five and forty-five degrees.

22. Vehicle according to claim 11, wherein at least a part of the sensors are disposed in the front bumper of the vehicle.

23. Vehicle according to claim 11, wherein it comprises seven pairs of sensors.

24. Vehicle according to claim 11, wherein the distance (e) separating the two points of aim on the ground (vn) of a same pair (Pn) is comprised approximately between 5 and 25 cm.

* * * * *